United States Patent [19]

Knezevich

[11] 4,119,453
[45] Oct. 10, 1978

[54] PROCESS FOR RECLAIMING AND UPGRADING THIN-WALLED MALLEABLE WASTE MATERIAL

[76] Inventor: Mike Knezevich, R.R. #1, Box 311 A, Wabash, Ind. 46992

[21] Appl. No.: 745,609

[22] Filed: Nov. 26, 1976

[51] Int. Cl.² .......................... B02C 13/14; B22F 1/04
[52] U.S. Cl. .................................... 75/0.5 R; 241/73;
241/188 R; 241/275
[58] Field of Search ................ 75/0.5 B, 0.5 R, 44 S;
241/73, DIG. 22, 275, 188 R

[56] References Cited

U.S. PATENT DOCUMENTS

| | | | |
|---|---|---|---|
| 2,758,360 | 8/1956 | Shetler | 241/275 |
| 3,283,698 | 11/1966 | Williams | 75/44 S |
| 3,322,529 | 5/1967 | Pollock | 75/0.5 B |
| 3,878,993 | 4/1975 | Welsch | 241/DIG.22 |

Primary Examiner—W. Stallard
Attorney, Agent, or Firm—Albert L. Jeffers; John F. Hoffman

[57] ABSTRACT

Recovery of industrial or sorted collector's waste containing at least one malleable, thin sectioned material such as copper, tin, lead, silver, aluminum or malleable alloys and/or plastic materials which are malleable at selected temperatures, such as thermoplastics and thermoplastic rubbers, is accomplished in a dry process by first cutting and/or grinding to a suitable size and thereafter impacting in a manner to form the malleable materials into spheroids having apparent densities in proportion to their malleabilities. Thereafter, the spheroids are more easily and effectively separated by conventional means, such as gravity tables. The resultant polished spherized or shotted material is more effectively re-used and constitutes an upgraded product.

29 Claims, 7 Drawing Figures

PROCESS FOR RECLAIMING AND UPGRADING THIN-WALLED MALLEABLE WASTE MATERIAL

BACKGROUND

In the art of recovering waste materials and, more particularly, mixed waste materials as well as industrial processing trim, rejects, scrap, punching trim, laminated waste and especially waste containing at least one thin sectioned product, prior metals separating art has encountered difficulty in effecting separation by the usual properties of magnetism, density, and size.

Platelets contained in shredded waste do not respond well to the air flotation and vibratory conveying actions of conventional separation "gravity tables." Platelets may, after cutting, remain flat or may be rumpled, folded, or rolled into tubes or other forms which give no constant and predictable "apparent density" or "apparent specific gravity" which is the property enabling separation to occur on the "gravity table" separators.

Furthermore conventional art can satisfactorily effect certain separations, such as separating shredded waste toothpaste tubes from residual paste, plastic caps and iron closure clips, but such thin walled flake-like product is of very low value because it is so bulky to handle, so poor a heat exchanger that it melts slowly in remelt furnaces and oxidizes to a damaging degree in so doing because of the great surface area exposed to the heat and air. Beer, motor oil, and soft drink cans similarly may be reclaimed from mixed wastes by hand sorting, but also represent high labor cost and low valued products because of similar reasons plus the fact that if they are not shredded and merely baled or briquetted, the contained moisture, residual product, dirt, ink enamel contamination, and foreign metal and non-metal contamination lowers the value even further.

In addition to the above mentioned, other examples of waste having thin walled components are: coaxial cable, heat exchanger tubing consisting of thin walled copper and aluminum and sometimes solder, printed circuit boards and other metal-plastic laminates, assorted electronic circuit assemblies, condensers, transformers, canned relays and condensers, and future mixed metal and plastic laminates currently being tested for solar heating systems.

Prior reclaimed metals separation art, using the dry process, consists essentially of the general steps of: (1) gross manual separation (2) reduction to airveyable size and polishing the discrete particles (3) magnetic separation of iron (this may occur at several locations) (4) particle sizing by grading screens and (5) specific gravity separations.

Separations are based on magnetic removal of iron and on differences of specific gravity or density of whatever shaped particles are being separated. Because particle shapes vary so greatly, we use the terms "apparent density" or "apparent specific gravity." An air blast acts differently on a flat platelet or short piece of fine wire than it does on a denser round sphere. This makes possible the separation of fine wire or platelets or flakes from coarser wire and other denser shapes of the same metal having higher apparent density. Since this is not the goal of the recovery system, it becomes a handicap because the flakes and fine wires of copper may float along with larger but heavier, higher apparent density aluminum particles.

Prior art provided no method for efficiently making separations of all unlike shapes of different materials.

SUMMARY OF THE INVENTION

The subject process eliminates the mixed shape separation problems by converting all materials which are to be separated on the gravity tables to roughly sperical lumps or spheroids and thereafter grading them to size. Thus the gravity tables are comparing the apparent specific gravities of metals in comparative shapes and size and thus eliminate the dissimilarities caused by odd shapes. Added advantages consist in the fact that when fine wire is spherized, it no longer is inclined to plug the sizing and separator screens as it usually does. Aside from the advantages of processing the spherized material during separation, there is an added valuable advantage in the fact that the end product(s) are dense free-flowing easier melting, polished metal shot which brings a premium price on the market. Since the separations are much more efficient, the analysis also may be held to closer tolerances, giving further reason to command a premium market price.

In practicing the subject process, feed materials are processed in the same manner as used in prior art except that after reduction to size, the material may in some cases be fed directly to the spherizer and then, after grading or sizing, to the gravity tables. In case there is too much extraneous matter such as insulation, this may be removed on a gravity table before passing the metal to the spherizer. Sizing and separations of similarly sized fractions follow as with prior art.

Thus it should be emphasized that the use of the spherizing step may be variably introduced into the sequence of the operation depending upon the material mixture being processed. The use of spherizing before final separation is the only critical feature of the sequence of the process. The contribution to the art of this process consists essentially in its ability to effect more efficient separations and to produce a better physical shape or form of the product based at least partly on the differences in ductility and/or malleability of different metals or alloys thereof.

It is essential to understand the uniqueness of the mechanism and its action in producing a spheroid particle of metal or other malleable or ductile material in order to understand the process. In its simplest form (see FIG. 1.) a platelet or flake of thin malleable metal 1 is fed into a confined area having a rotary paddle 2 and a stationary case, or case liner the inner surface of which has at least one ridge or interrupting surface usually approximately parallel to the axis of rotation of the paddle(s) 3. The paddle 2 strikes the just fed slower moving platelet 1 and throws it against the stationary surface ridge 3. The impact with the ridge slows the particle down so that as it glances off the ridge it is again struck by a faster moving paddle. This continues until the particle escapes through a suitable exit. The interesting feature is that the thin particle is crumpled a little each time it is struck plus the fact that a free moving particle of irregular shape will align itself, as a dart does, with its least dense part in the rear, so that each blade blow crushes the most irregular part of the particle and thereby forms a roughly spherical or spheroided particle. This concept seems to explain the results obtained; but since the explanation followed the discovery of the method and was suggested by another person, it is only submitted to help understand the process.

The degree of densification varies with the malleability of each metal or alloy. Platelets of shredded electrical assemblies containing spring bronze relay arms mixed with copper, aluminum, and brass terminal strips may be spherized. The hard bronze will respond least to the impacting while the soft copper will form the densest shot of spheres. Aluminum in most of its forms work hardens more than copper so it is inclined to form less dense spheres. Most brasses respond well but some hard brasses may be separated from softer grades.

The above generalizations change at elevated temperatures. A mill with a 42 inch diameter rotor can work heat particles to red heat if operated at high speeds (e.g. 1200 rpm). At such temperatures most metals are annealed and become ductile and form dense spheroids. By control of temperature and speed, metals having differing annealing temperatures may be processed. For maximum flexibility, efficiency, and safety, it is advisable to provide temperature controls. This may be easily accomplished by circulation of heated or cooling air in suitable channels in the framing and control of throughput air volumes. The cooling air may simply be circulated as coolant or may be used as a means of assisting in conveying the finished product. When elevated temperatures are desirable or a controlled non-oxidizing fluid is preferred to air, such may be re-circulated through the jacket ducts and then separated from the end product at a cyclone and be re-circulated repeatedly. Added advantages result from use of "burned air" as a carrier fluid when processing magnesium-containing products which are otherwise hazardous.

Definitions

The following terms as used herein are defined as follows:

malleable material: Material which may be permanently formed or deformed by the blow of a tool or other impact.

spheroid: A shape roughly approximating a sphere such as a hammered particle.

spherizer: A machine which beats or impacts other shapes into spheroidal shape. E.G. short pieces of cylindrical or square wire, shredded sheet, fragments of granulated aluminum or other metal casting or plate, as well as certain malleable plastic particles.

granulator: A multi-bladed rotor turning within a case likewise equipped with blades as well as a size controlling exit screen used to chop or cut plastics, softer metals and the like into granules. A machine used to reduce material to a desired granular size.

granules: Small particles which are airveyable or otherwise easily bulk handled and fed. Sizes roughly range from a maximum dimension of 1 to a minimum of 1/16 inch. Below that size it can be called a powder.

impacting: This term is used in an effort to avoid other connotations of the word "beating" which implies the existence of an anvil or other support. The word "swat" would be more descriptive but perhaps unacceptable. The intent is to express both the blow of a moving surface as it strikes a free falling particle and also the collision of a projected particle against a stationary or counter rotation target.

sizing: Grading on a stacked or other screen as to size. Reduction to size may be grinding in a granulator.

apparent density: (Also apparent specific gravity) The specific gravity of a porous or hollow spheroid as contrasted to the true specific gravity of the metal which forms the shape.

shot: A roughly spherical particle - usually solid in section. Shot results from melting metal and dropping it through an air space or a dense particle approaching shot can be formed in a spherizer when a red hot fully annealed particle is impacted suitably. Its density then approaches true metal density.

specific gravity tables: Are well known by the semi-precious metals reclaiming trade and one form consists of an uphill conveying shaker table combined with an upflow of air through the screen bottomed conveying table which gives a simultaneous fluidized bed effect. These result in the heavier fractions climbing uphill and out while the lighter material flows downward and out a separate discharge port. The air lifting effect is erratic with non-spherical shapes and very effective with spherical mixtures of similar size. The apparent specific gravity of a particle determines both its conveying and fluidizing response.

acceleration and deceleration: A just-fed particle is swatted or impacted and given the speed of the rotor or accelerated. Upon striking a rib on the case liner, it slows down and glances away as a decelorated particle. Because it is moving more slowly than the rotor, it is swatted from the rear (which action crumples that part of it) and re-accelerated. This action is repeated at high frequency in a spherizer.

unsupported trajectory: Is herein used to insure that the explanation of the action of processing particles in a machine with stationary (or possibly counter-rotating) ribs and rotary blades is not confused with usual grinding, smearing or shearing action. By keeping the rotor members well-spaced from the stationary members, a bouncing and swatting sequence exists. The use of closely adjusted rotor members would defeat the desired action and cause dust by grinding. If the particles were unable to bounce and glance off rotor and stator, there would be little or no formation of spheroids. An overloaded machine blade just pushes a mass of feed material ahead of it and gives a grinding action not unlike that of a ball mill and produces dust. The use of an air path or unsupported trajectory is necessary for the desired hammering action which results from impacting or swatting the particles against one target surface at a time to cause spheroid formation. A single surface impaction is not a beating or hammering on an anvil which would compact the inner structure of the spheroid.

blade: The replaceable hard alloy moving impact surface fitted to the tip of each paddle of the rotor — usually 4 to 16 per rotor varying with diameter of rotor.

sweep air: Air or other gaseous transport fluid (as "burned air" or other controlled atmospheric) used to convey the particulate material through or from the spherizer and to a cyclone or other collection device.

residence time: Time contained in processor.

target surface: Case liner or rib on liner against which an accelerated particle impinges or impacts.

carrier fluid: Medium, usually air, in which particles are conveyed. May be any gas, gas mixture, or in special cases a liquid.

DETAILED DESCRIPTION

Figure 3:
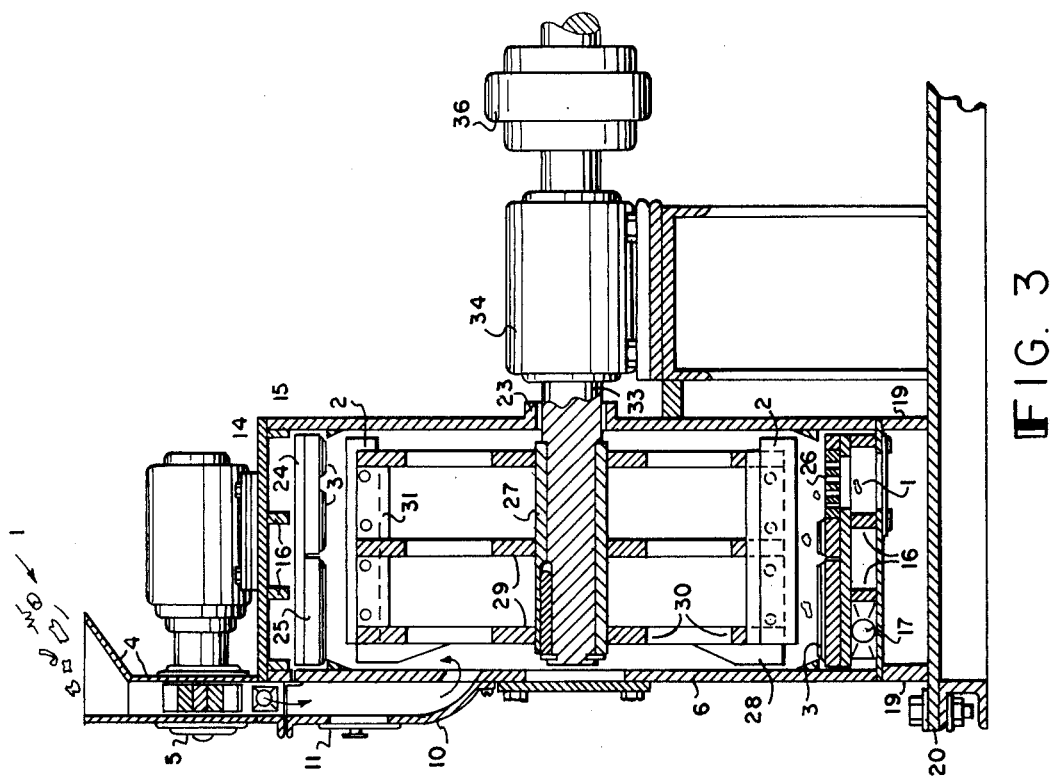
FIG. 3 is a sectional view taken along line 3—3 of FIG. 2 and viewed in the direction of the arrows.
Figure 2:
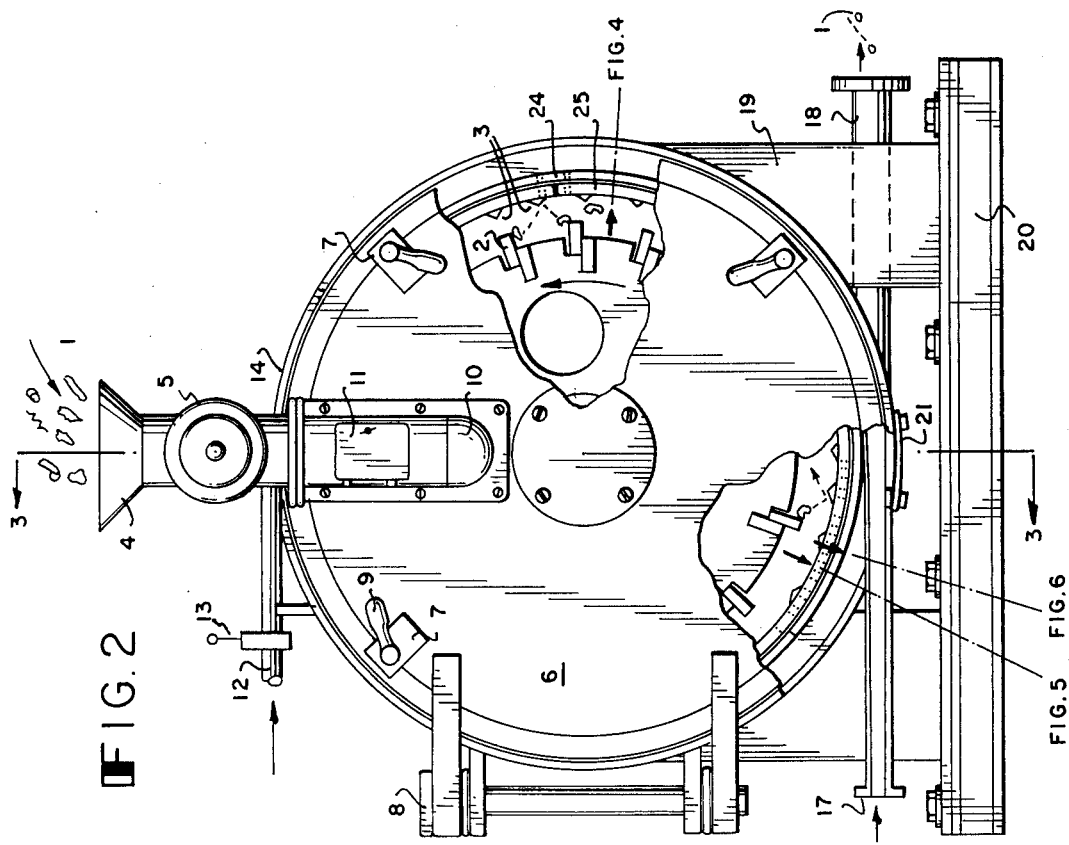
FIG. 2 is an elevational view of the apparatus with portions thereof broken away to illustrate the details of construction.

A preferred form of apparatus is illustrated in FIGS. 2 and 3. This spherizing apparatus or "shot mill" consists of a case assembly provided with a feed assembly, a rotor assembly and drive means. The feed assembly 4 consists of a rotary feeder 5 which controls feed rate as well as prevents massive air inflow. The feed hopper 10 may be equipped with baffles to prevent particles from being thrown back by the rotor and is fitted with an air intake nozzle 12 which contains an air flow control damper 13. The hopper 10 is mounted on the door 6 which is equipped with hinges 8 and lock tabs 7 and held by lock bolts 9.

The case assembly consists of an outer shell 14, back plate 15, supports 19, baseplate 20, inner structural ribs 16 which also form temperature control cooling air ducts (see FIG. 6) which supply air introduced at inlet nozzle 17 for conveying the processed material when that air flow joins the inner air flow admitted at 12 and egresses through the product discharge port 18. A cleanout port 21 is provided under the grating to assist in removing the grating and removing foreign metal when a grade change is being made.

The case assembly is fitted with a removable liner support shell 24 and a wear resisting liner 25. This liner is fitted with ribs 3 as in FIGS. 1,2,3,4 & 5, either by casting or by welding application. The liner may be a heavy rolled sheet or may be an assembly of sections which may be chill cast. FIGS. 2 and 3 illustrate two sectional rings formed into a liner. The shell 24 and liner 25 are fitted with outlet ports and grating 26 (also see section FIGS. 4,5,6)

The rotor assembly consists of a hub 27 which carries feed acceleration fan blades 28 and support discs 29 having air recirculation holes 30 suitably disposed. The discs 29 carry blade support plates 31 which in turn carry wear resisting impacting blades 32 which are the equivalent of the schematic moving impact plate 2 of FIG. 1.

Figure 7:
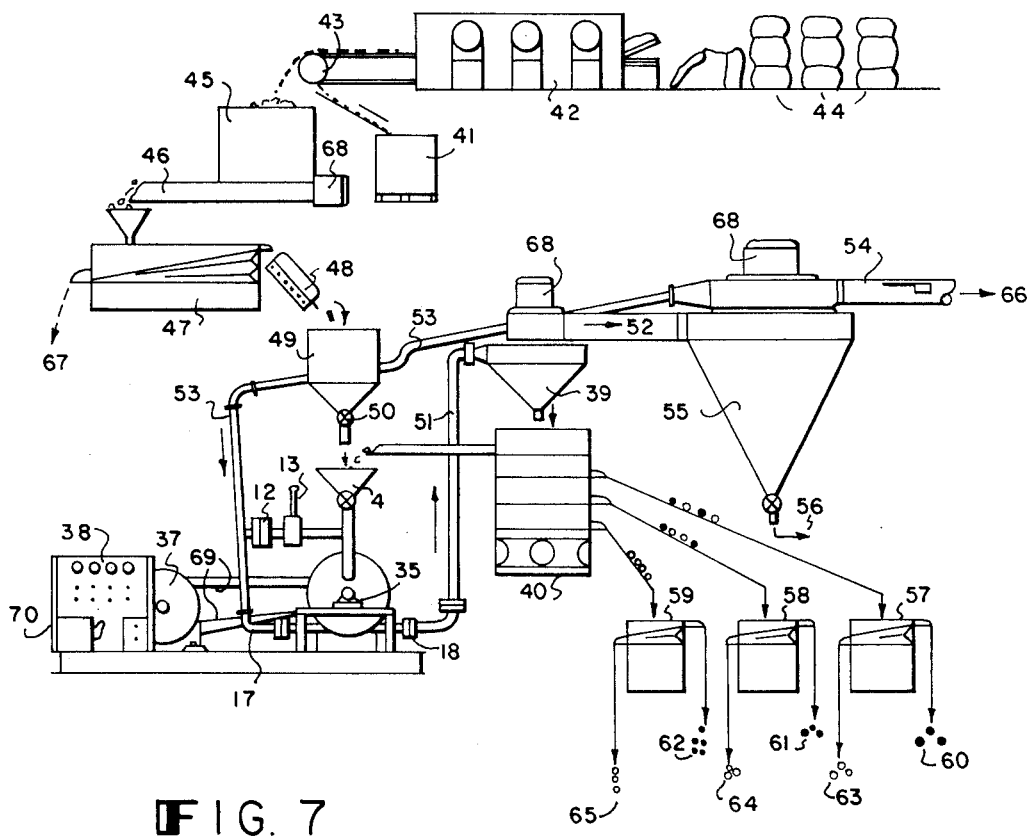
FIG. 7 is a diagrammatic representation of the apparatus and method of the present invention.

The rotor assembly is carried by drive shaft 33 supported by main bearing 34 and optionally by an outboard removable bearing 35 indicated for larger machines, and shown only in the schematic drawing FIG. 7.

Drive coupling 36 connects with drive motor 37 which is controlled by console 38. Also see FIG. 7.

In FIG. 7, the product discharged from 18 is ducted to blower equipped cyclone 39 which discharges pressured air to case secondary air inlet 17 and air inlet nozzle 12 with excess air discharged to vent. Cyclone 39 drops the spherized metal mix into sizing screen 40 which supplies gravity tables 57-59 with material for separation using equipment standard to known art.

Figure 1:
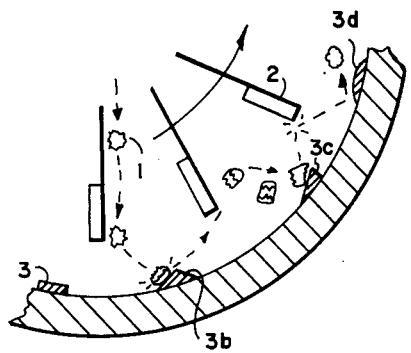
FIG. 1 is a diagrammatic sectional view of a portion of the apparatus according to the present invention showing the manner in which the feed material undergoes spherizing.

FIG. 1 shows liner plates 25 with ribs 3, 3b, 3c, & 3d consisting of either hardface welded ridges, weld attached matrices containing granular carbides or other abrasion resistant ridges having crossectional shapes generally approximating the forms of either, 3b, 3c, or 3d, however attached.

Figure 4:
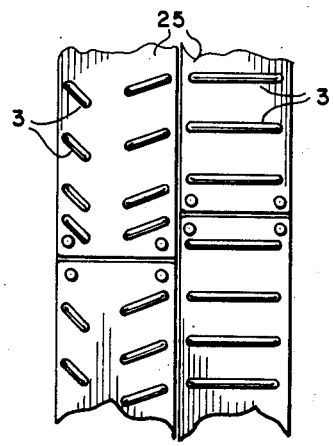
FIG. 4 is a fragmentary view of the sectional liner plates as viewed from inside the case to the right of the door opening.

FIG. 4 shows the sectional liner plates as viewed from inside the case to the right of the door opening and shows target ridges 3 which are generally parallel to the axes of the case in the forward liner while the rear liner exhibits angled ridges whose angles serve to aid in moving the circulating material toward the rear where the exit grating is located. The short reverse angled target ribs 3 assist in minimizing abrasive wear of the edge of that liner which abuts the rear wall 15 (not shown). The angles of these angled ridges are exaggerated but show that effective target deflecting is possible even with non-axial ridges.

Figure 5:
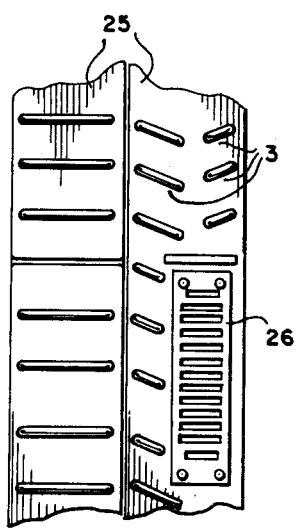
FIG. 5 is a fragmentary view of the sectional liner plates as viewed from the inside looking left.
Figure 6:
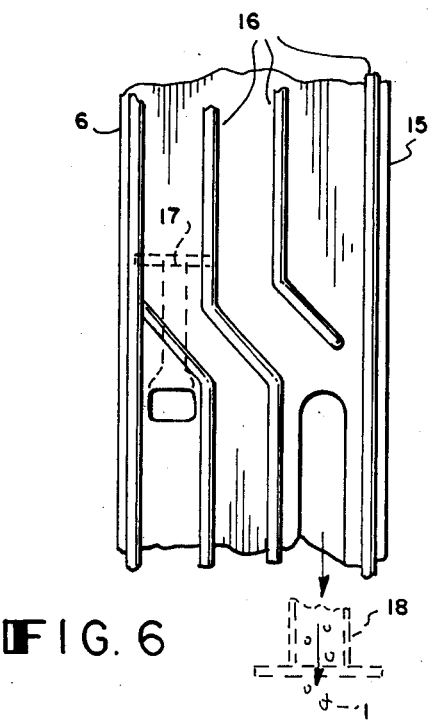
FIG. 6 is a view similar to FIG. 5 with the liners removed.

FIG. 5 is similar to FIG. 4 except viewed from inside looking left at 6:00 to 7:00 to show the exit grating 26 as well as straight and angles ribs 3. FIG. 6 shows the same view as FIG. 5 but with both the liner 25 and liner support 24 removed to show the crossover section of the reinforcing rings 16 which form the ducts for cooling and product removal sweep air which joins the air carrying the processed material through the grating 26 and convey the product 1 out 18 and to the cyclone 39 (see FIG. 7).

DESCRIPTION OF OPERATION OF THE PROCESS

EXAMPLE I

Radiators consisting of mixed fins and tubing of aluminum and copper are reduced to small fragments by known means such as "alligator" shears, "Cumberland" (or other) granulators and the like. The resultant mixed metal leaflets are separated from the non-metallic carrier material and fed to a spherizer as herein above described. This machine processes the feed material as below discribed.

The rotary feeder 5 FIGS. 2 & 3 drops the feed material 1 into hopper 10 where controlled air flow entering 12 sweeps it into the machine. Its residence time in the machine is controlled by air damper 13. As the fragments are bounced back and forth between blades 32 and the ribs 3 on the liner 25, they become generally spherical in shape and in such denser form exit through grid 26. An intense air eddy condition exists within the impacting area in the mill which effect is aided by the fan like action of the wide blade support plates 31 and the holes 30 which interconnect the chambers formed by the rotor discs 29.

Upon dropping or being mildly blown through the grid 26, the dense spheres need more air flow to transport them up to a cyclonic separator. Such secondary air is provided by air entering inlet 17 where it exits through outlet 18, mixed with sweep air which entered through 12. If an excess of sweep air were passed through the inside of the case, it could reduce residence time to give insufficient or imcomplete spherizing.

The conveyed product is separated from its conveying air by cyclone 39 and dropped into a Sweco sizing screen 40 shown in FIG. 7. Each discharge port supplies a gravity table final separation device. After separation, the dense spherized product is suitably packaged for sale or other conversion.

Copper separations may easily be obtained with less then 3% maximum aluminum content and, under close supervision, copper purity of 98/99% may be obtained,

EXAMPLE II

A mixed feed material composed of electronic waste material such as oil radios, telephone switchboard and relay station equipment and the like is pulverized and granulated into a mixture of particles containing non-metal such as plastic, glass, procelain and carbon mixed with particulate and thin sheet metallic particles from "printed circuitry" containing iron, bronze, silver contacts, aluminum sheet chasis and/or condenser foil, plus copper wire and copper foil, as well as a fair amount of soldered wire ends and soldered terminals of copper or brass.

This feed mix after size reduction is freed of its non-metallic content on gravity tables, the iron is removed by means of magnetic belts and the remaining mixture of metals run through a room temperature spherizer to avoid losing the solder.

The spherized mix is graded into sizes and each size subdivided by gravity tables using the well-known fluidized bed and conveying vibration screen method. Spherized pellets of leaded copper, copper and bronze may be separated from less dense spheroids of brass, hard bronze, and aluminum. Subsequent passes over more closely adjusted gravity screens can separate these fractions. Even copper coated aluminum wire can be separated from copper wire and aluminum wire. Silver contacts and soldered terminals may be separated from the copper fraction in closely adjusted fractionating of spheroids using specific gravity tables due to the fact that the malleabilities and work hardening properties differ.

EXAMPLE III

In Example III, fragmented scrap brass tubing and sheet is separated from an antimony-bismuth-lead alloy used in bending brass tubing in the manufacture of wind instruments. While this separation can be accomplished by other simpler means, it serves as an example of separating ductile brass from a non-ductile metal which under high speed impaction is converted to dust and thus separated in a cyclonic separator followed by a bag collector for the metal dust.

EXAMPLE IV

When a spherizer is fed shredded, particulate, hard bronze spring metal and operated at high surface velocity and temperature, the particles reach or approach "red heat" and become annealed enough to become malleable and formable into spheroids. The change in physical form renders the material more easily handleable and enhances its market value. Separation follows the same general steps as in example I.

EXAMPLE V

Heavily lacquered aluminum containers and enameled aluminum magnet wire ofter are problems to recover. Material to be reclaimed is precut to feedable size and spherized at a temperature hot enough to burn off the insulation and lacquers. The lacquer pigment is freed from the metal in the spherizer, burnished and separated in suitable dust collectors without need for the usual grinding and polishing with a carrier medium as is a series of granulators. Wire which was unrecoverable by conventional means has been spherized and reclaimed in upgraded form. Used toothpaste tubes and aluminum cans also may be recovered without "burning off" in a furnace and baling.

EXAMPLE VI

A particulate mixture of cured thermosetting plastic such as phenolic molded parts mixed with a particulate th thermoplastic material of similar specific gravity such as granulated polyvinyl chloride is obtained by grinding up plastic waste.

When this mix is fed through a spherizer at a temperature just adequate to render the PVC deformable but not tacky, it forms beads while the hard thermoset particles are milled to dust if given adequate residence time. The warm rubbery PVC is easily separated from the thermoset dust - in suitable cyclones or on simple sizing screens.

This separation is made possible by using the malleability of the thermoplastic material at the specific or selected temperature where malleability is acquired and is characteristic of each given material. Similarly, heated polystyrene or mathacrylic can be separated from brittle thermoset materials or, if cold and brittle themselves, may be shattered to dust and separated from ductile or tough materials at room temperature such as certain nylons, polyolefins or polycarbonates.

While the general type of apparatus is typically presented in FIGS. 2, 3, & 7, it must be understood that any mechanism which employs a moving surface and a stationary surface in a non-contacting relationship — separated by at least the maximum dimension of a pariculate feed material (preferably by a greater separation equal to from 2 to 10 times the particulate feed materials maximum dimension) where the difference in surface speeds of the two surfaces is over 5,000 SFM (and where means for feeding, containing, and withdrawing the product are provided) comes within the scope of the herein taught art.

The particular mechanism described is described as running in a continuous rather than as a batch treatment. It is obvious that the machine can discharge into a storage container and recycle the same batch of material repeatedly until a desired degree of treatment is obtained and thus constitute a "batch" process. Therefore the process is capable of either batch or continuous operation although a continuous operation is usually perferable. Either arrangement is considered as taught by this subject process.

The process carried out by the described apparatus consists in projecting and impacting a feed material or mixed feed containing at least one malleable component to form it into spheroid shape. Said generally spherical shaped particle is uniform and easily separable from a mixture of non-malleable particles.

It is especially effective to form all contained feed material into spheroids because, if spherized to each material's ultimate or true density, spherical shapes composed of different materials are easily and precisely separated on efficient "gravity tables. "

The spherizing process, however, opens a new concept: the use of the fact that no two metals work harden to exactly the same degree at the same temperature (unless the temperature is above the annealing temperature of both metals) and consequently don't compact equally to their ultimate density. Differences in the resulting Apparent Density determine the ease of separation on gravity tables. It just so happens that in general the heaviest metals are intrinsically more malleable than the lighter and work harden less. Therefore aluminum, for example, in addition to being intrinsically lighter, forms even lighter spheroids with lower apparent specific gravity, This makes its separation from copper even easier than it would be if dense aluminum spheres of true specific gravity resulted — as melted shot.

Because of the uniqueness of the process and of the purity of the products obtainable, this process constitutes a valuable addition to the art of metals separation and recovery.

Because either annealed or work hardened metal shot can be produced by control of speed, residence time, and temperature, the product itself is new, unique and useful. It is easily identified by its surface texture, even in its porous or low specific gravity, spherical, work hardened form, it is easily poured and fed into shape forming cold pressing dies or remelting furnaces.

In its annealed form with higher or even ultimate density (if melted or hot forged in the spherizer), the particles are easily identified under the microscope by their impacted surfaces. These denser, annealed spheres comprise a new and useful raw material suited to automatic shape-making operations as well as for remelting.

Although this process has been in commerical operation for a few months, there has been insufficient time to establish critical speeds and all temperature effects. A simple primitive test with a modified fan-like device established that the method was workable. Bigger units were immediately put to work at higher and higher surface speeds. Representative speeds employed and found effective are 10,000/15,000 surface feet per minute, although slower speeds (e.g. 5.000SFM) may be adequate for certain separations. Also to be mentioned is the observation that when the "blades" 32 are fitted with less than ¼ inch clearance from the liner ribs 3, a dust forming problem arises. Preferred blade clearances appear to be from ⅜ to 1¼ inch when processing feed material passing ½ to 1 inch screens in the genulators although a detailed study is yet to be made. It is interesting to note that the patent literature is full of described equipment having close blade clearance and used to make metallic dusts, but none mention use of wide separation of blade-to-rib to make shot-like spheroids. Neither is mention made of the use of elevated temperatures.

One limitation of the process should be kept in mind; very soft metals like tin-lead solders tend to plate or burnish onto other metals if severely impacted, especially at elevated temperatures.

Also bear in mind that brittle metals such as certain zinc alloys, "type metal" alloys containing antimony, and alloys of bismuth, silicon and the like, may break into dust and may thus be separated and collected as dust from mixtures of spheroided malleable metals such as aluminum and/or copper. The final dust collection equipment is known art for other industries, but the process for impacting the malleable fraction in a device of the described type to make dense spheroids which separate from metal dusts is new art. Use of the described imparting device to selectively make dusts of those particlers having a given degree of friability is also new art. It does not just grind everything in the mixture to dust as do usual machines having no control of grinding intensity.

It should be pointed out specifically that the process consists in the swatting and bouncing of ductile material fragments instead of cutting same. The impacting surfaces (2) or "blades" (32) are made of hard alloy not because they must cut, as in a granulator, but because they must resist a special type of high speed wear which is perhaps enhanced by the presence of metal oxide films on the metals being processed. In any event a mild steel blade (32) will not last many hours even when processing shredded copper foil from which its printed cercuit boards has already been removed in earlier granulation and separation steps.

It is considered quite probable that the disintegration equipment used in the well known equipment for "micronizing" of friable powders using compressed air to accelerate and convey particulate material to and against a targets would, if tested with malleable materials likewise form spheroidal products. Such systems, however, would probably be economically non-competitive with the present invention when used with the heavier, larger, bulkier, and irregular types of metallic feed materials encountered with metals reclamation.

It is expected that the combination of the ability to spherizemalleable metals by means of this process,- which also has the ability to shatter brittle metals and even, if specifically designed for the purpose, form particulate granules of lathe turnings composed of steel, gray iron and the like - with its shattering action on brittle materials, may well lead to broad usage for salvaging much of the small part mixed metal waste not presently reused.

A new line of products consisting of controllable specific gravity spheroids of assorted metals is presented. The process for making same is described and an apparatus for accomplishing the process are given in detailed drawings. These are additions to the art of metals separations and recovery but also contribute new products which are raw materials capable of being used for other new products.

I claim as new:

1. The method for making spheroidal pellets of malleable material comprising the steps of:
   reducing a feed material to a desired particulate size,
   in a spherizing zone spherizing the material by repetitively and successively impactively accelerating, impactively decelerating, and impactively reaccelerating the feed material by means of at least one moving surface which throws the material through an air space against a contained target surface which does not contact the moving surface, the minimum distance between the moving surface and target surface being greater than the maximum dimension of the feed material particles,
   moving the material being processed along a generally spiral path,
   controlling the residence time in the spherizing zone by controlling the volume of conveying air,
   continuously removing the spherized material through a sizing grating, and
   separating the spherized material from the conveying air in a collection device.

2. The method of claim 1 wherein the successive operations are carried out on a continuous basis.

3. The method of claim 1 wherein the impacting is carried out under controlled temperature conditions.

4. The method of claim 1 wherein the impacting is carried out in a controlled atmosphere.

5. The method of claim 1 wherein the impact and target surfaces move from 5,000 to 20,000 surface feet per minute with respect to each other.

6. The method of claim 1 wherein the moving and target surfaces are separated from each other by from greater than one to ten times the maximum dimension of the average particle of feed material.

7. The method for separating mixtures of dissimilar materials, at least one of which is malleable, comprising the steps of:
reducing the mixed materials to feedable particulate size,
impacting the particles to deform them into spheroid shapes by striking them with one surface thereby projecting them in free flight fashion at high velocity against another surface, the respective surfaces being non-contacting relative to each other and separated by a minimum distance greater than the maximum dimension of the feed material particles,
withdrawing the spheroidal particles,
conveying and collecting the spheroidal particles,
grading the spheroidal particles by size,
separating similarly sized spheroidal particles having differing apparent specific gravities by use of specific gravity table means, and
collecting the separated fractions.

8. The method of claim 7 wherein the successive operations are carried out on a continuous basis.

9. The method of claim 7 wherein the impacting is carried out under controlled temperature conditions.

10. The method of claim 7 wherein the impacting is carried out in a controlled atmosphere.

11. The method of claim 7 wherein the surfaces comprise impact and target surfaces, respectively, which move from 5,000 to 20,000 surface feet per minute relative to each other.

12. The method of claim 7 wherein the surfaces comprise impact and target surfaces, respectively, which are separated from each other by from greater than 1 to 10 times the maximum dimension of the average particle of feedable particulate size.

13. A method for separating mixtures of particulate metallic materials having differing degrees of malleability, which consists of feeding the material and uniformly, repeatedly and successively:
accelerating all the particles,
throwing the particles through an unsupported trajectory by means of a moving impact surface,
impinging and decelerating the particles against at least one contained target surface in a manner which results in forming the malleable particles into spheroidal particles having differing apparent densities,
said moving and target surfaces being separated by a minimum distance greater than the maximum dimension of the feed material particles,
withdrawing the spheroidal particles through a size controlling outlet,
separating the spheroidal particles from their conveying air,
grading the spheroidal particles according to size, and
separating similarly sized spheroidal particles of malleable metals from more malleable material on conventional specific gravity tables.

14. The method of claim 13 wherein the throwing, impinging and decelerating is carried out under controlled temperature conditions.

15. The method of claim 13 wherein the throwing, impinging and decelerating is carried out in a controlled atmosphere.

16. The method of claim 13 wherein the particles are thrown by a moving impact surface, and wherein the impact and target surfaces move from 5,000 to 20,000 surface feet per minute relative to each other.

17. The method of claim 16 wherein the impact and target surfaces are separated from each other by from greater than one to ten times the maximum dimension of the average particle of feed material.

18. A mass of spheroidal particles each having a hammered surface texture and an interior less dense than its exterior produced by the process of successively and repetitively impactively accelerating a particulate feed material, impactively decelerating the material and impactively reaccelerating the material by means of at least one moving surface which throws the material through an air space against a contained target surface which is spaced from the moving surface by a minimum distance greater than the maximum individual dimensions of the feed material, said spheroidal particles having relative apparent densities varying in proportion to their malleability.

19. The spheroidal particle of claim 18 wherein its diameter does not exceed one-half inch.

20. A metal spheroidal particle according to claim 18 wherein the apparent specific gravity thereof is less than the specific gravity of the contained metal.

21. A metal spheroidal particle according to claim 18 which has been heated and annealed while being impacted so as to be a completely annealed spheroid.

22. A metal spheroidal particle according to claim 18 which has been heated and impacted in a non-oxidizing gaseous fluid to give the resultant spheroid an impact textured, unoxidized surface.

23. The spheroidal particle of claim 18 which is formed from a fragment of malleable wire.

24. An apparatus for converting irregularly shaped malleable feed material into spheroidal shape comprising:
a retaining case,
means for feeding particles and a gaseous conveying fluid at a controllable and constant feed rate and ratio into said case,
impacting means for continuously and repetitively projecting the particles in free flight and at a high velocity against target surfaces,
said impacting means including a driven rotary impeller having abrasion resisting blade tips rotating at 5,000 to 20,000 surface feet per minute in spaced relationship with a substantially enclosed circularly sectioned liner in said case,
said target surfaces comprising abrasion resisting transverse rib members on said liner,
said blade tips being spaced from said rib members by a distance greater than the maximum dimension of the feed material, and
said liner being provided with one or more exit ports enabling the particles to be withdrawn from said case.

25. The apparatus of claim 24 wherein the space between said rotary blade tips and said liner ribs is from ½ inch to 2 inches.

26. The apparatus of claim 24 including temperature control ducts affixed to said case.

27. The apparatus of claim 26 wherein the temperature control ducts are contained within an outer portion of said case and include means for supplying secondary gaseous fluid which joins and assists the gaseous conveying fluid in carrying said particles from said apparatus.

28. The apparatus of claim 24 wherein said sectioned liners are replaceable.

29. The apparatus of claim 25 wherein said abrasion resistant tips are replaceable.

* * * * *